2 Sheets--Sheet 2.
M. E. BURTLESS.
Ditching-Machine.
No. 168,967. Patented Oct. 19, 1875.
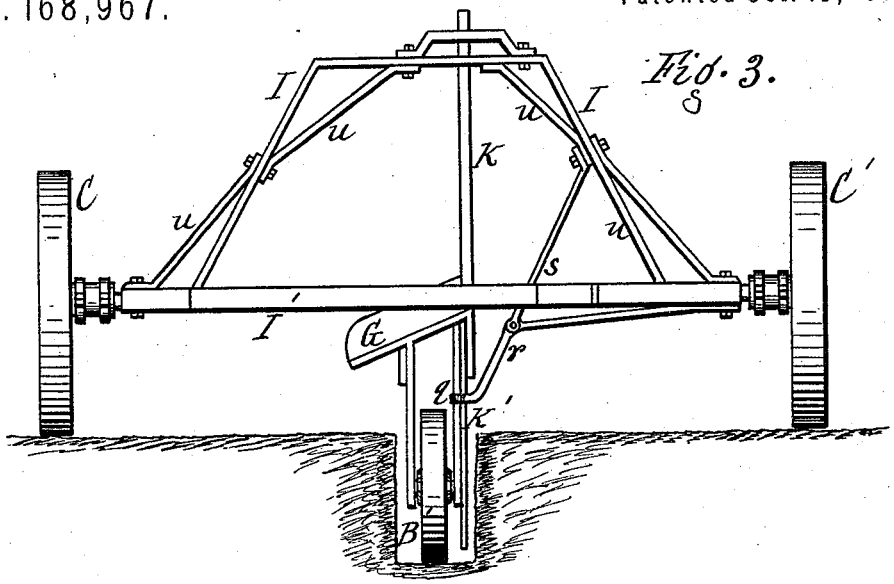
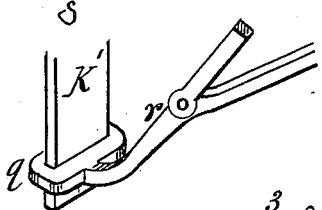
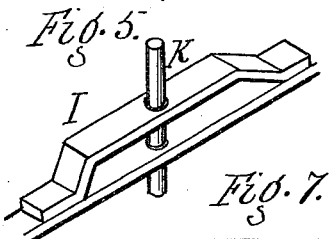
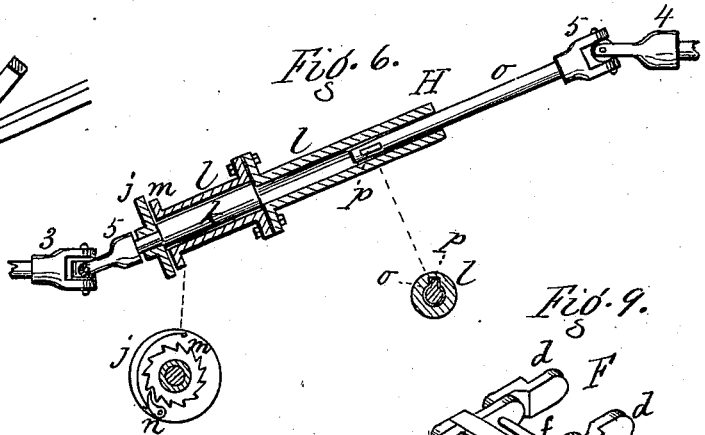
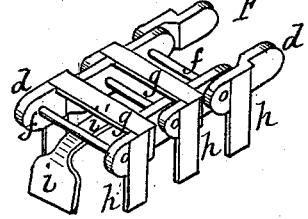
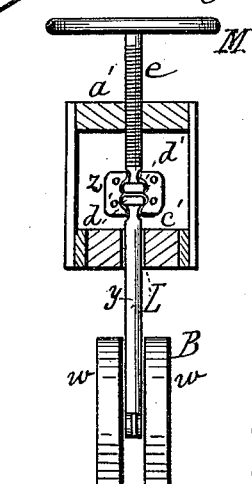
Witnesses.
Edwin B. Scott
Louis Spahn
Inventor.
Martin E. Burtless
per R. F. Osgood
Atty.

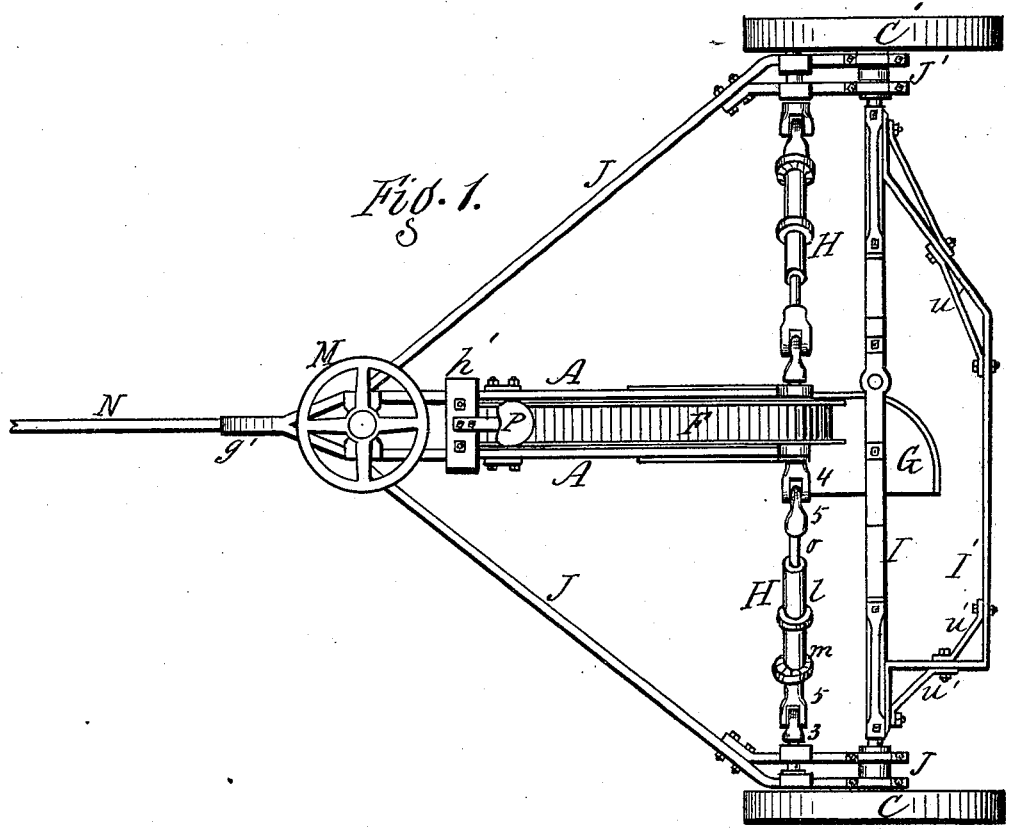
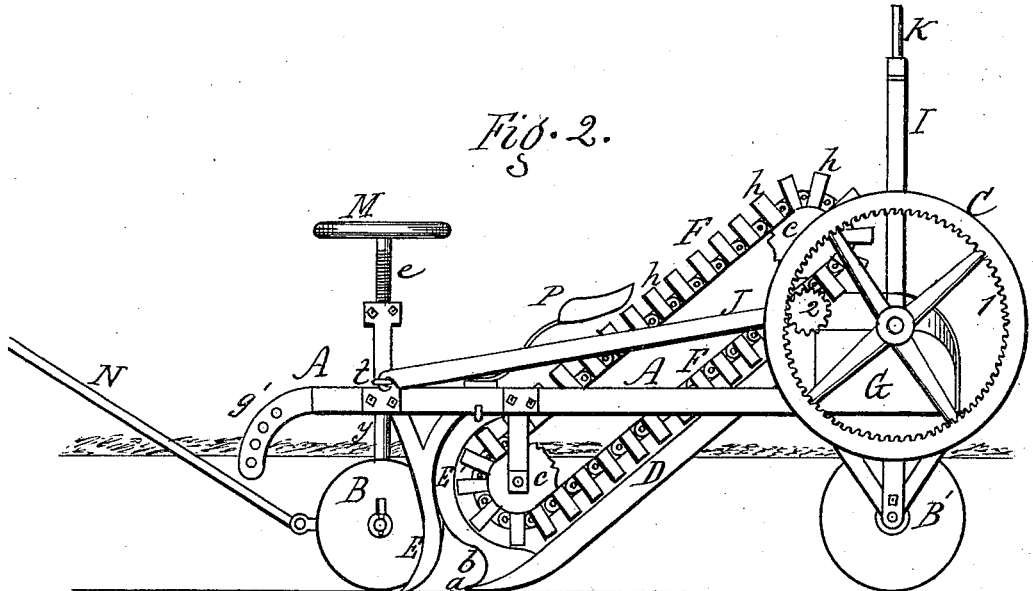

UNITED STATES PATENT OFFICE.

MARTIN E. BURTLESS, OF SENECA FALLS, NEW YORK.

IMPROVEMENT IN DITCHING-MACHINES.

Specification forming part of Letters Patent No. 168,967, dated October 19, 1875; application filed March 26, 1875.

*To all whom it may concern:*

Be it known that I, MARTIN E. BURTLESS, of Seneca Falls, in the county of Seneca and State of New York, have invented certain new and useful Improvements in Ditching-Machines; and I do hereby declare that the following is a full, clear, and exact description of the construction and operation of the same, reference being had to the accompanying drawings, in which—

Figure 1 is a plan. Fig. 2 is a side elevation. Fig. 3 is a rear elevation. Figs. 4, 5, 6, 7, 8, and 9 are detail views.

My invention consists in the combination and arrangement of parts, as hereinafter described.

A A represent the frame, which consists of two longitudinal bars of suitable form to hold the operating parts. At the front it has a supporting-wheel, B, and at the rear a similar wheel, B', both of which run in the ditch. At the rear are two driving-wheels, C C', resting on the ground outside the ditch, and serving the double purpose of driving the machinery and of keeping the ditcher in the necessary upright position. D is a scoop, attached to the frame, resting in an inclined position, as shown, and having a sharp edge, $a$, in front for cutting the dirt. In front of this and on opposite sides are two knives or cutters, E E', bolted to the frame A A, and serving to cut the sides of the ditch. The knife E stands, preferably, a little in advance of E', and the latter has a concave, $b$, next to the scoop, to which it is attached at its lower end. By this means the cutting of the sides of the ditch is facilitated, and the knives cut only such a width as will be taken up on the scoop. The inner or rear edge of the knife E' is circled to form a guard to the endless belt, and prevent the dirt from falling off at the sides of the scoop at the point where it is taken up. F is the endless belt, which runs around pulleys $c$ $c$, its angle being the same as that of the scoop. This belt is of little less width than the scoop, and consists of the lags $d$ $d$, Fig. 9, connected by pivots $f$ $f$, and stayed together on opposite sides by cross-bars $g$ $g$. This allows the flexibility necessary to pass around the pulleys $c$ $c$, and the latter are notched to receive cross-pivots $f$ $f$, and prevent slipping of the belt. The lags are provided with vertical fenders $h$ $h$, which project outward or radially at right angles to the belt, as shown, and are so arranged that when operating in coincidence with the scoop their lower ends come in close contact with its surface, as in Fig. 2, thus serving to retain the dirt from falling off from the sides of the scoop as it is elevated. These fenders serve simply to inclose the dirt on the scoop.

It will be seen that the fenders leave a space between the two opposite rows and beneath the belt, in which the dirt lies in a body as it is raised.

The scoop at its upper end may have guides near its edges, within which the ends of the fenders run to prevent the fenders from catching against the standards of the upper pulley as they pass. The belt is also provided with a series of hoes or lifters, $i$ $i$, of a form suited to the kind or condition of dirt to be raised, whose shanks $i'$ $i'$ connect with the belt in such a manner as to allow the necessary play and flexibility of the latter. The hoes project outward from the belt, and are so arranged that when they pass the lower pulley $c$ they strike down into the dirt on top the point of the scoop and then drag upward on the scoop, carrying the dirt with them. The fenders, before described, moving in coincidence with the hose, prevent the dirt from falling off at the sides. In passing the circle of the lower pulley the hose receive a forward impetus sufficient to strike deep into the dirt, and in passing the upper pulley they receive a corresponding impetus sufficient to discharge or shake off the dirt, which then falls upon the chute G, and is discharged at the side of the ditch. Two chutes may be used, if desired, one outside the other, so as to leave two lines of the discharge, and not impede the machine in digging deep ditches. The fenders rest close to the side of the ditch in operation, and are not liable to injury by striking stones, the sides being cleared by the cutters.

A belt thus constructed differs from ordinary endless belts in not carrying the dirt up on top the belt, but in dragging it up at the bottom over the inclined scoop, and the holes and fenders are essential in catching and holding the dirt in its passage.

Motion is imparted to the upper pulley $c$ by the following arrangement: Each of the driving-wheels C C' has an internal gear, 1, with which engages a pinion, 2. The shaft of each pinion has a coupling-head, 3, and the shaft of the pulley $c$ has two corresponding coupling-heads, 4 4. With these heads 3 4 connect the coupling-heads 5 5 at the ends of the shafts H H, these constituting a universal coupling at each end. The lower end of each shaft H has a fixed head, $j$, Fig. 6, and above this a spindle, $k$, on which rests a loose sleeve, $l$, which turns thereon. To the lower end of the sleeve is attached a ratchet, $m$, with which engages a spring-pawl, $n$, of the head $j$. This engagement gives motion to the shaft H when the driving-wheel moves forward, but releases it when the driving-wheel moves backward, the pawl, in that case, slipping back over the ratchet. This is essential, in passing curves and corners and in backing up, not to produce back action of the mechanism.

In the upper end of the sleeve $l$ fits a spindle, $o$, attached to the upper coupling-head 5. This spindle has a spline, $p$, which fits in a corresponding slot of the sleeve, and thereby insures turning of the spindle with the sleeve, while the sleeve is allowed to slide endwise over the spindle. By this means the shaft H is lengthened or shortened according as the driving-wheels C C' rise or lower, which is necessary, not only as the ditch grows deeper, but also in allowing the wheels to pass over inequalities at the side of the ditch.

The axles of the driving-wheels C C' are connected with a rear-axle frame, I I', which slides up and down vertically upon a standard, K, Figs. 1, 3, and 5, which is attached to the frame A A of the ditcher. The ditcher runs upon the bottom of the ditch, and as it lowers, or as the driving-wheels run higher on the outside, the frame I I' will correspondingly slide up on the standard K. And since this standard is a fixture of the ditcher, the latter will be held upright in a right-angled position at all times with the driving-wheels, the latter operating, therefore, to keep the ditcher in place. The vertical part I of the driving-wheel frame is an arch, stiffened by braces $u$ $u$ $u$, while the horizontal part I' is bent outward at right angles, and is correspondingly stayed by braces $u'$ $u'$ $u'$, the object of this part I' being to give strength to the driving-wheel C'. Beneath the standard K is a way, K', which may form a continuation of the standard. On this slides a bearing, $q$, forming part of an arm, $r$, attached to the frame I' and braced by a stay, $s$. By this means a sliding connection at the bottom, as well as at the top, is secured, whereby the frame of the driving-wheels may move up or down without affecting the ditcher. The arm $r$ and brace $s$ also form a connection between the two rear wheels B' C', by which they are retained in the same relative position at all times and can never get out of place, nor can the ditcher get out of its right-angled position, as it would do if there were no connection below the standard K. The three wheels C C' B' all run in the same transverse line.

J J are arms on opposite sides of the machine, attached at the front end to hooks $t$ $t$ of the main frame A, and having at the rear end two bearings, J' J', resting on the hubs of the driving-wheels, and holding the pinions 2 2. These bars serve as draft-connections to hold the driving-wheels in place, and they also allow the vertical motion of the driving-wheels just described. I design to bring the pinions 2 2 as near as possible to the top of the internal gears 1 1, so that the thrust upon the pinions will be forward rather than downward, thereby not pressing heavily upon the connections J J.

It is essential in this machine that the standard and way K K' should be central, and that they should extend from the axle of the rear ditcher-wheel B' to such a height as to preserve the engagement with the axle-frame I I' at whatever depth the ditcher may fall in its work. By means of this central connection free vertical movement is allowed to the parts, and the rear ditcher-wheel will, at all times, be kept parallel or in line with the outer wheels C C' at whatever incline the latter may run at the sides of the ditch. The central position of the parts K K' allows an easy motion of the frame and ditcher in rising and falling, and obviates the great strain and twist that occurs where two bearings are used, one each side of the center.

It is also essential in this machine that two of the self-adjusting coupling-shafts H H should be used, one on each side of the machine, for since the sides of the ditch are inclined and irregular one wheel, C, frequently falls while the other rises, in which case one rod, H, lengthens while the other shortens, and still both give motion equally to the driving-pulley of the endless belt. It is necessary to use a shaft on each side in order to equalize the power and prevent side drifting of the machine, or greater pressure on one side of the ditch than the other. In turning curves one wheel also frequently turns so slowly as to be insufficient to give the proper motion to elevate the dirt. The two coupling-shafts are indispensable to give proper motion to the elevating apparatus, and their combination with the ditcher and outside frame is such as to insure free and easy motion at all positions and inclines of those parts. The ratchets on the coupling-shaft allow backing up without running the belt backward, and also compensate for the vibrations of the wheels.

The front supporting-wheel B is made in two counterparts, $w$ $w$, which rest independently on two journals, $x$ $x$, on opposite sides of a central axle-frame, L, Figs. 7 and 8. The standard $y$ of this frame passes up into a swivel-head, $z$, above which is a screw, $e$, operated by a hand-wheel, M. By turning this hand-wheel in one direction or the other the supporting-wheel B will be correspondingly raised or lowered. In going through the ditch the hand-wheel is turned so as to elevate the supporting-wheel, thereby lowering the scoop and allowing it to cut into the dirt. At the end of the ditch the hand-wheel is turned to lower the supporting-wheel, thereby elevating the scoop from the dirt, and allowing the machine to be turned at the end of the ditch without digging, or to be transported from one point to another. The machine is then passed through the ditch the opposite way, the scoop being let down, and the dirt is thus distributed on both sides of the ditch. The screw $e$ rests in a bearing, $a'$, Fig. 7, while the standard $y$ passes loosely through a bearing, $c'$. The two ends which meet in the swivel-head $z$ have enlargements or heads $d'\ d'$, which prevent their withdrawal from the swivel-head. By this means the vertical adjustment is allowed, and the screw and the standard have a free and independent turning movement, which is essential in operating the device. This arrangement of the swivel-head and the enlarged ends of the standard and screw form an improvement on the wheel and screw shown in my patent of May 25, 1869.

The horizontal part $f'$ of the axle-frame L projects forward and backward, and has jointed to its front end a tongue, N, by which the machine is guided, and at the rear end a scraper, $v$, for clearing the wheel of dirt. The draft of the machine is applied to the bent end $g'$ of the main frame A A, which has a series of holes for the purpose. The tongue N is connected with the neck-yoke of the team, and is simply used to guide the machine. The wheel B, made in two parts, $w\ w$, as described, nearly fills the ditch, and either part can move independent of the other. The central axle-frame L between allows the tongue to be attached centrally, which could not well be done if the wheel was made entire to nearly fill the ditch. P is a driver's seat, which is made adjustable longitudinally on the main frame A A by means of a movable platform, $h'$.

I do not claim, broadly, the free, vertical self-adjustment of the outer frame and the ditcher independently of each other. Neither do I claim, broadly, an extensible coupling-shaft, having universal joints; but

What I claim as new is—

1. The endless belt F, constructed with the lags $d\ d$, cross-bars $g\ g$, fenders $h\ h$, and lifters $i\ i$, in combination with the inclined scoop D, as and for the purpose specified.

2. The combination, with the main frame A and driving-wheels C C', of the draft-bars J J, connecting the driving-wheel with the front end of the frame, and the axle-frame I I' sliding upon the standard K, for the purpose of allowing the vertical adjustment of the ditcher, as shown and described.

3. The combination, with the axle-frame I I' and rear ditcher-wheel B', of the central standard and way K K', extending from the axle of the ditcher-wheel loosely up through the frame, for the purpose of retaining said parts in proper parallel position at different inclines, and preventing undue strain, as herein shown and described.

4. The combination, with the driving-wheel C' and rear supporting-wheel B', of the arm $r$, brace $s$, and bearing $q$, resting upon the way K', for the purpose of forming a connection between said wheels to stay the supporting-wheel, as herein described.

5. The combination, with the outside frame and ditcher, of the two self-adjusting coupling-shafts H H, provided with the ratchets $m$ and pawls $n$, and connecting the driving-gearing with the endless-belt pulley on opposite sides of the machine, the whole arranged to operate in the manner and for the purpose set forth.

6. The combination, with the divided supporting-wheel B, of the axle-frame L, provided with the vertical standard $y$, for connecting with the elevating-screw and the horizontal bearing $f'$, for the attachment of the tongue N and scraper $v$, as shown and described.

7. The combination of standard $y$ and screw $e$, provided with the heads $d'\ d'$, inclosed by the swivel $z$, for allowing independent movements of said parts, as described.

In witness whereof I have hereunto signed my name in the presence of two subscribing witnesses.

MARTIN E. BURTLESS.

Witnesses:
R. F. OSGOOD,
E. B. SCOTT.